United States Patent
Kronfeld (10) Patent No.: US 6,201,494 B1
(45) Date of Patent: Mar. 13, 2001

(54) AUTOMATIC STORM FINDING WEATHER RADAR

(75) Inventor: Kevin M. Kronfeld, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/364,634

(22) Filed: Jul. 30, 1999

(51) Int. Cl.[7] .................................................. G01S 13/95
(52) U.S. Cl. ................................ 342/26; 342/460; 702/3
(58) Field of Search ........................ 342/26, 460, 73–81, 342/123; 702/3

(56) References Cited

U.S. PATENT DOCUMENTS

| | | | |
|---|---|---|---|
| 5,534,868 | * | 7/1996 | Gjessing et al. .................... 342/26 |
| 5,623,267 | * | 4/1997 | Wurman ................................ 342/26 |
| 5,781,146 | * | 7/1998 | Frederick ............................. 342/26 |
| 5,945,926 | * | 8/1999 | Ammar et al. ...................... 340/970 |
| 6,018,307 | * | 1/2000 | Wakayama et al. ................ 342/26 |
| 6,085,152 | * | 7/2000 | Doerfel ................................. 702/3 |
| 6,097,329 | * | 7/2000 | Wakayama ........................... 342/26 |

* cited by examiner

Primary Examiner—John B. Sotomayor
(74) Attorney, Agent, or Firm—Nathan O. Jensen; Kyle Eppele; J. P. O'Shaughnessy (57) ABSTRACT

An automatic storm finding weather radar is disclosed that uses a storm finding algorithm to automatically control the weather radar to eliminate manual control. The storm finding algorithm uses the 0° C. isotherm altitude where precipitation is most likely to first occur to calculate an altitude search layer to find storms. The storm finding algorithm calculates the antenna upper and lower tilt angles and the number of scans to search the altitude search layer. A list of useable antenna tilt values is formed to drive the antenna controller. The antenna controller scans the antenna at the lower tilt angle and then moves to the next tilt angle until the search is complete. The search is then repeated using any new data.

14 Claims, 6 Drawing Sheets

AUTOMATIC STORM FINDING WEATHER RADAR

BACKGROUND OF THE INVENTION

This invention relates to weather radar systems and more specifically to finding storms with an automatic storm finding weather radar without performing manual adjustments to the weather radar system.

Weather radar systems are used on aircraft to detect the presence of storms and turbulent weather. Weather radar detects storms by detecting the presence of precipitation in the atmosphere during flight. With today's existing weather radar systems, pilots must continuously modify the radar controls, searching for reflective precipitation throughout the flight. The pilot must manually adjust the tilt and range to search for storms in the atmosphere. This is a significant workload for pilots. The pilot may be busy performing other tasks and not paying attention to the weather radar. This may result in not utilizing the weather radar to its maximum potential and may result in a hazardous condition if a severe storm were missed.

Attempts to solve this problem have included the use of a terrain database. A terrain database is stored in the weather radar and is used to adjust the tilt of the weather radar antenna to avoid pointing the antenna towards the ground. If the terrain rises in front of the aircraft in the form of a mountain as indicated by the terrain database, the antenna tilt toward the ground is decreased. Depending on the altitude of the aircraft, the antenna tilt may even be increased above the horizontal direction. The use of the terrain database avoids ground clutter and does reduce some of the need for adjustment of the antenna tilt. However, manual adjustment is still required over other tilt angles to find storms.

Automatic tilt functions have been developed for weather radar. These automatic tilt functions compensate for changes in the selected range, altitude, and attitude. Once the proper tilt has been set, the radar maintains the proper tilt by measuring the aircraft altitude. When a different range is selected or the aircraft altitude or attitude changes, the automatic tilt function aims the antenna in the proper direction, leaving only minor adjustments to be made by the flight crew. This automatic tilt function still requires manual adjustments and does not find a storm but just compensates for aircraft maneuvers.

Automating the manual search is desirable. However automating the search for precipitation requires a search algorithm. What is needed is an automatic storm finding algorithm to be implemented in an automatic storm finding weather radar system.

SUMMARY OF THE INVENTION

An automatic storm finding weather radar for use in an aircraft is disclosed. The automatic storm finding weather radar comprises an antenna and a receiver/transmitter connected to the antenna for transmitting radar signals and receiving radar signals reflected from a storm. A signal processor connected to the receiver/transmitter processes the received radar signals reflected from the storm into weather data indicating the storm. A display connected to the signal processor is used for displaying the weather data indicating the storm. An antenna controller controls the tilt and scan of the antenna. A computer controls the automatic storm finding weather radar. The computer includes an automatic storm finding algorithm for locating storms by determining temperatures and altitudes that produces the storms, determining an altitude search layer over the temperatures and altitudes that produce the storms and driving the antenna controller to adjust the antenna tilt and scan to locate the storms in the search layer at a desired range from the aircraft.

It is an object of the present invention to provide an automatic storm finding algorithm in an automatic storming finding weather radar.

It is a feature of the present invention to provide an automatic storm finding weather radar that automatically suggests tilt and range values.

It is a feature of the present invention to determine where in the atmosphere storms will develop and exist.

It is an advantage of the present invention to use atmospheric temperature to locate precipitation.

These and other objects, features, and advantages are disclosed and claimed in the specification, figures, and claims of the present application.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
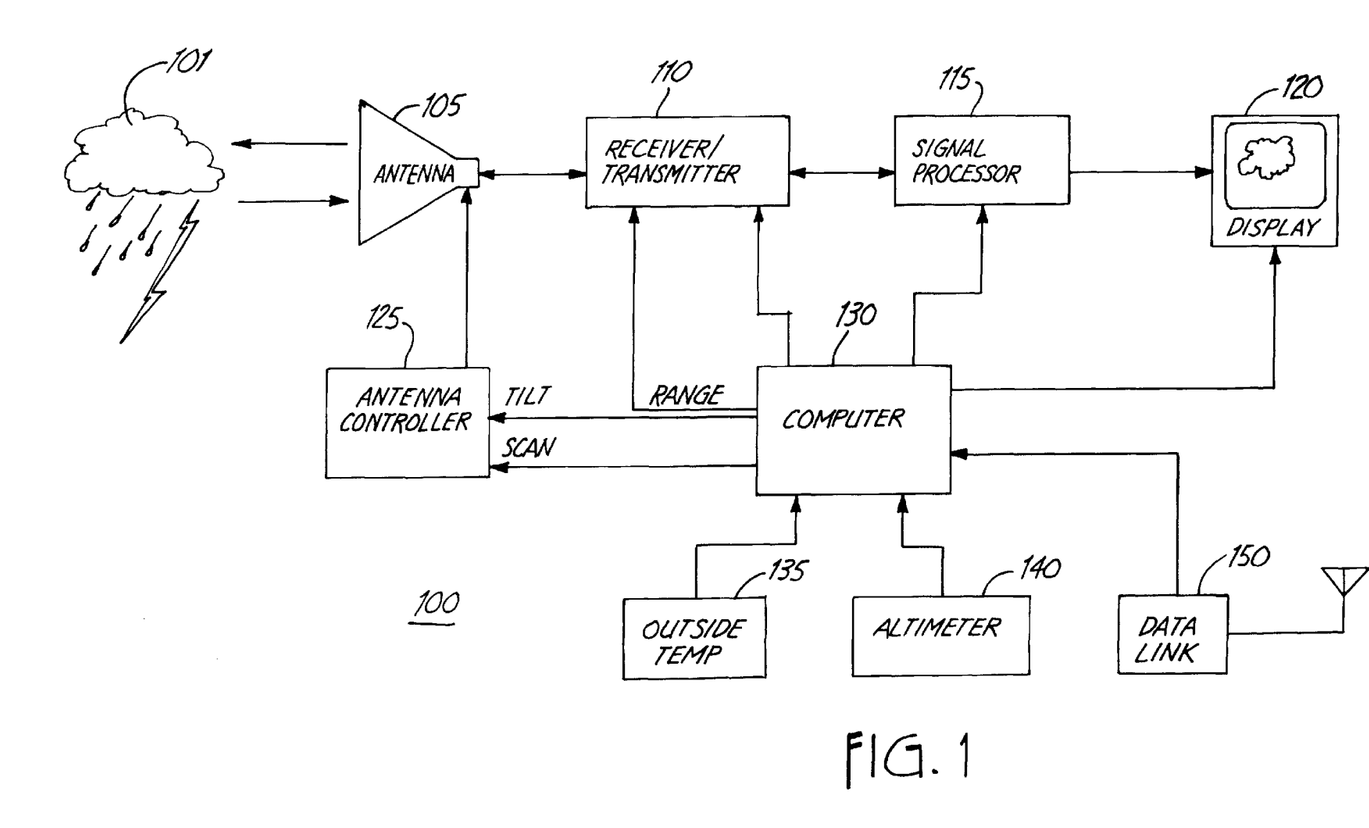
FIG. 1 is a block diagram of an automatic storm finding weather radar employing the present invention.

A block diagram of an automatic storm finding weather radar 100 of the present invention is shown in FIG. 1. A weather radar consists of an antenna 105 and a receiver/transmitter 110 for transmitting and receiving the radar signals. A signal processor 115 is used for processing the received radar signals into weather information and a display 120 is used for displaying the weather information. A computer 130 controls the weather radar system and an antenna controller 125 controls the antenna 105 positioning. The range of the automatic storm finding weather radar may be controlled by various methods such as adjusting the transmitter power or pulse width or varying the receiver gain. Inputs from an altimeter 140 for measuring the aircraft altitude and a thermometer 135 for measuring the outside temperature may be added to an automatic storm finding weather radar 100 of the present invention. A data link 150 may be used to up link weather information to the weather radar computer 130. The automatic storm finding algorithm is contained as software in the computer 130 to form the automatic storm finding weather radar 100 of the present invention.

Weather radars function by transmitting radar signals typically in the form of pulses at a microwave frequency, typically in X-band, from the receiver/transmitter 110 (FIG. 1). The pulses are reflected from water droplets or precipitation that make up a storm cell 101 back to the antenna 105. The receiver/transmitter 110 receives the reflected pulses and the signal processor 115 processes the received pulses to form the weather information data about the storm cell. The storm cell 101 and other related weather information are displayed on the display 120.

The storm finding algorithm of the automatic storm finding weather radar 100 of the present invention operates by finding where storms are first going to generate radar echoes. Condensation occurs at or near the 0° C. isotherm altitude level. This altitude level is known in the art as the bright band level. This is an excellent area to focus a search for reflective precipitation. However, updrafts from slower developing storms can create initial reflective precipitation at altitude levels where the air is slightly warmer than 0° C. Slower developing storms have been found to have first echoes at altitude levels as warm as 10° C. This would result in a 5000-ft search layer for temperatures from +10° C. up to 0° C. based on two degrees C. per 1000 ft as determined from standard atmospheric data. These temperatures are approximate and other temperatures could be used. Conversely, faster developing storms can have first echoes well above the 0° C. altitude level. Findings suggest scanning for fast developing storms between the 0° C. to −25° C. altitude levels, which represents a 12,500-ft search layer above the 0° C. altitude level. For safety reasons and radar beam resolution considerations, this could be increased to a 15,000-ft search layer. Other temperatures and altitudes could be used.

The storm finding algorithm of the automatic storm finding weather radar of the present invention takes into account the full lifecycle of a storm cell. In the early stages of storm development, condensation continues at the first echo level as long as warm, moist updrafts are present. Once the water molecules in the storm cell are too heavy to keep aloft, they will begin to fall. This is the dissipating stage, which marks the ending of the storm cell development. However, since most water molecules are above the altitude of the first echo, they must fall through the first echo area before they reach the earth's surface. This means that a storm cell will produce a radar echo at or near the area of its first echo after it begins to dissipate. Based on this, it can be inferred that a storm cell will produce a radar echo at or near the first echo throughout its lifecycle. A search algorithm based on the approximate 0° C. isotherm will be adequate for all stages of storm development.

In the current example the +10° C. to −25° C. altitude search layer can be estimated in several ways. The aircraft's current altitude can be measured with the altimeter 140, the outside temperature with thermometer 135, and standard atmosphere table data stored in the computer 130 memory can be used to estimate the altitude of the 0° C. isotherm. A second method would be to use the freezing altitude level data provided by the National Weather Service or some other similar source. The freezing altitude level data could be provided at the aircraft position and also at other ranges from the aircraft such as 25, 50, 100, 150 nautical miles. Having this data at several ranges would yield a better freezing level estimate. This data would be up-linked to the aircraft over a data link 150 and loaded in to the computer 130 or through a voice-transmission for manual loading into the computer 130. A third method would be the use of in-situ measurements of the atmospheric temperature at varying altitudes during the ascent of the aircraft again by the use of the altimeter 140 and outside thermometer 135, identifying the 0° C. isotherm and storing the temperature and altitude data in memory. The most accurate method is the first where the current altitude and temperature is measured.

Once the upper limit altitude and the lower limit altitude are determined, the storm finding algorithm will calculate the search layer from the altitude limits. For example using one of the three methods of estimating the 0° C. isotherm (freezing level) described above, the 0° C. isotherm is determined to be 10,000 ft. Knowing that fast developing storms will produce a radar echo as much as 15,000 ft above the 0° C. isotherm level of 10,000 ft, it can be determined that the upper or highest altitude where storms are going to develop is at 25,000 ft. (10,000+15,000). The lowest altitude where slow developing storms will produce a radar echo is at 5000 ft. (10,000−5,000). This is based on the fact that slow developing storms will produce a radar echoe 5,000 ft below the 0° C. isotherm. In this example the upper altitude or −25° C. altitude is 25,000 ft and the lower altitude or +10° C. altitude is 5,000 ft and the search layer is 20,000 ft (25,000−5,000).

Continuing with the current example, the automatic storm finding weather radar scans the 5,000-ft to 25,000-ft search layer of the atmosphere for precipitation. To do this the algorithm must determine what weather radar tilt settings must be used to effectively scan the search layer. The upper tilt angle setting ($\theta_A$) and the lower tilt angle setting ($\theta_B$) are determined using geometry.

For the purposes of the following discussion, the parameters listed below are defined where:

F=estimate of the 0° C. isotherm (freezing level) (ft msl)
A=current aircraft altitude (ft msl)
$L_A$=thickness of search layer above freezing level (15,000 ft)
$L_B$=thickness of search layer below freezing level (5,000 ft)
$R_C$=range beyond which coverage/scanning of the entire search layer is required (nautical miles)
θ=radar antenna beamwidth (degrees)
$\theta_A$=upper tilt angle (degrees)
$\theta_B$=lower tilt angle (degrees)

The tilt angles are measured from horizontal with angles above the horizontal being positive and below the horizontal being negative. $R_C$ represents the range beyond which complete coverage is required. Ranges from the aircraft up to $R_C$ are not searched on the first complete scan of the search layer. The area that is not searched on the first scan is located directly above and below the aircraft. Based on the limitations of the radar's tilt adjustment range (typically −15 to +15 degrees) and the fact that the aircraft is constantly moving, it is reasonable to initially disregard this area in the search layer.

Figure 2:
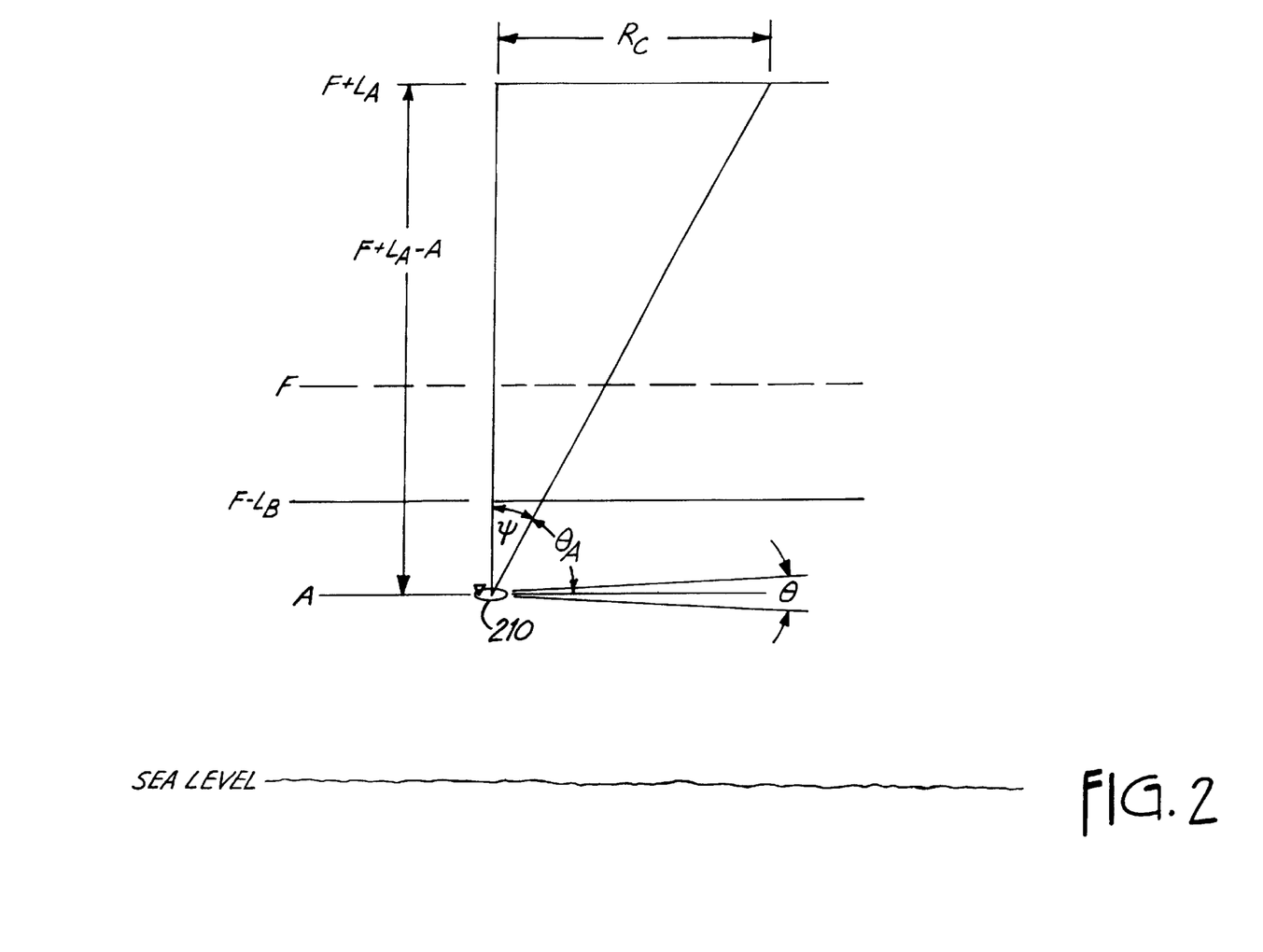
FIG. 2 is a diagram showing the geometric relationship of the aircraft, search layers, and the tilt angles with the aircraft below the lower altitude limit.

The aircraft altitude can be below the lower altitude limit, between the two altitude limits or above the upper altitude limit of the search layer. In the first situation shown in FIG. 2, the aircraft 210 is at an altitude below the lowest search altitude (A<F−$L_B$). The angle ψ in FIG. 2 is calculated as $$\tan\psi = \frac{R_c}{F + L_A - A} \qquad \text{Equation 1}$$

The upper tilt angle is $$\theta_A = 90° - (\psi + \theta/2) \qquad \text{Equation 2}$$

$$\theta_A = 90° - \arctan\frac{R_c}{F + L_A - A} - \theta/2$$

The lower tilt angle is $$\theta_B = \theta/2 \qquad \text{Equation 3}$$

Figure 3:
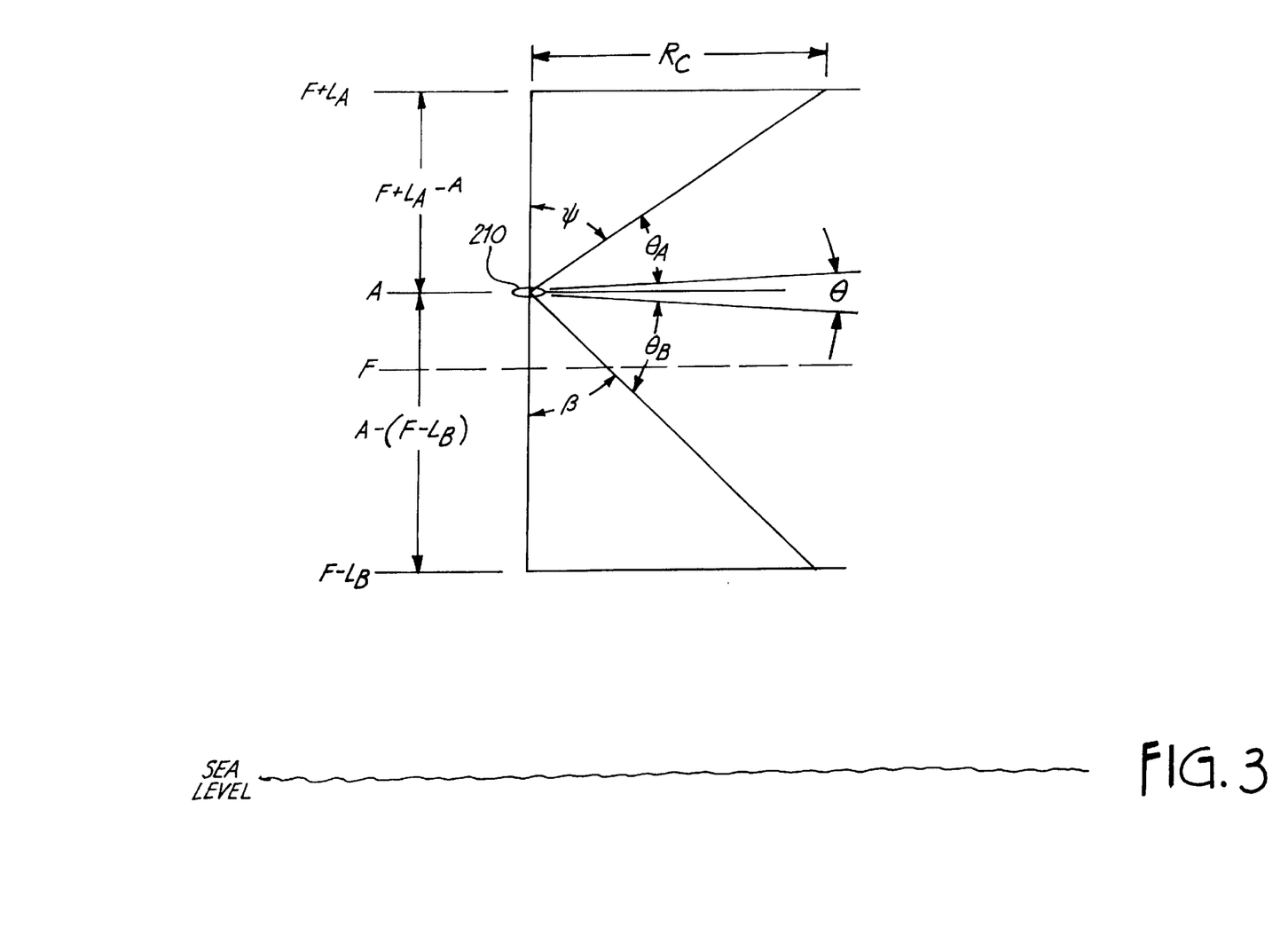
FIG. 3 is a diagram showing the geometric relationships of the aircraft, search layers, and the tilt angles with the aircraft between the upper and lower altitude limits.

In the second situation shown in FIG. 3, the aircraft 210 altitude is between the lower limit and the upper altitude limit. In this situation the upper tilt angle is the same as the situation shown in FIG. 2 and is given by Equation 2. The angle β is defined as $$\tan\beta = \frac{R_c}{A - F + L_B} \quad \text{Equation 4}$$

The lower tilt angle is $$\theta_B = \arctan\frac{R_c}{A - F + L_B} + \theta/2 - 90° \quad \text{Equation 5}$$

Figure 4:
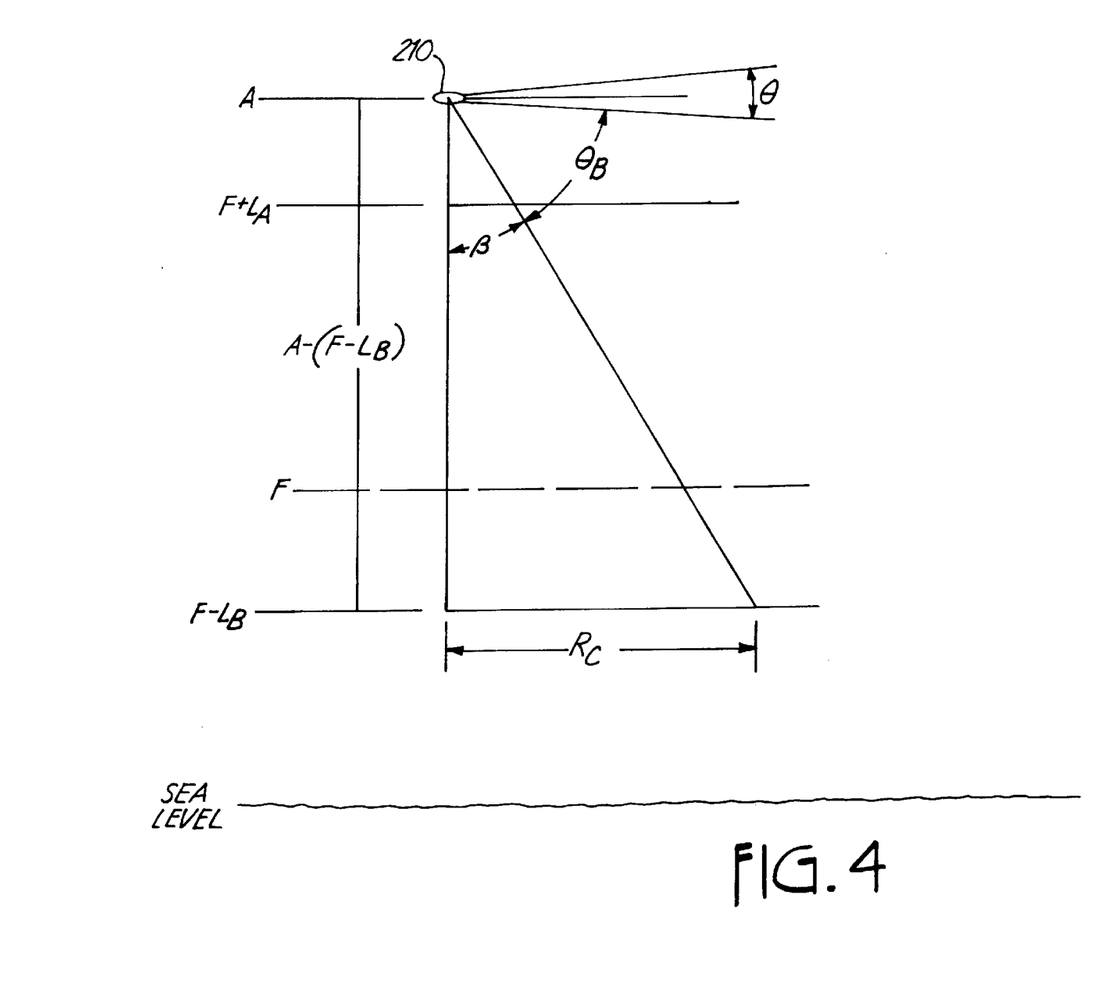
FIG. 4 is a diagram showing the geometric relationships of the aircraft, search layers, and the tilt angles with the aircraft above the upper altitude limit.

In the third situation shown in FIG. 4, the aircraft 210 altitude is above the upper altitude limit. In this situation the lower tilt angle is the same as that for the situation shown in FIG. 3 and is given by Equation 5. The upper tilt angle in this situation is given as $$\theta_A = -\theta/2 \quad \text{Equation 6}$$

The equations describing the three situations are summarized below. For the upper tilt angle the equations are $$\theta_A = \begin{cases} 90° - \arctan\dfrac{R_c}{F + L_A - A} - \theta/2 & \text{for } A < F + L_A \quad \text{Equation 7} \\ -\theta/2 & \text{otherwise} \quad \text{Equation 8} \end{cases}$$

For the lower tilt angle the equations are $$\theta_B = \begin{cases} \arctan\dfrac{R_c}{A - F + L_B} + \theta/2 - 90° & \text{for } A > F - L_B \quad \text{Equation 9} \\ \theta/2 & \text{otherwise} \quad \text{Equation 10} \end{cases}$$

Continuing with the current example and again assuming that the freezing level (0° C. isotherm) is at 10,000 ft, the upper altitude limit for the search layer is 25,000 ft and the lower limit for the search layer is 5,000 ft. With the other variables as listed below, the tilt angles for the radar antenna can be calculated using the summary Equations 7 through 10 as appropriate.

A=18,000 ft
$L_A$=15,000 ft
$L_B$=5,000 ft
$R_C$=15 nautical miles
θ=3°

Using these values in Equation 7 yields for the upper tilt angle:

$$\theta_A = 90 - \arctan[(15 \cdot 6076)/(10000 + 15000 - 18000)] - 3/2$$
$$= 90 - \arctan(13.02) - 3/2$$
$$= 2.89°$$

Using the same values in Equation 9 yields for the lower tilt angle:

$\theta_B$=arctan [(15.6076)/(18000−10000+5000)]+3/2−90
$\theta_B$=arctan (7.0107692)+3/2−90
$\theta_B$=−6.62°

Once the algorithm finds the upper tilt angle $\theta_A$ and the lower tilt angle $\theta_B$, it determines how many radar sweeps will be needed to completely scan the area between $\theta_A$ and $\theta_B$. This can be accomplished by subtracting $\theta_B$ from $\theta_A$ and dividing the absolute value of the result by the radar beamwidth θ. The new resultant's ceiling value will be the number of sweeps the radar will need to make to successfully scan the search layer. The new resultant can be used to determine if the aircraft will be able to successfully scan the search layer before the aircraft approaches a new area that has not been searched for precipitation. Using a 100 nautical mile range when the bottom of the radar beam is parallel or at a positive angle relative to the earth will prevent the aircraft from getting too close to an area that has not been searched for precipitation. Using the values for $\theta_A$ and $\theta_B$ previously calculated the number of sweeps is abs[2.89−(−6.62)]3=4.

A list of tilt values needed to scan the search layer will be created by successively adding the beamwidth to $\theta_B$ and storing each addition as a tilt to be used until the additive value is greater than or equal to $\theta_A$. Once the list of tilt values is generated, each tilt value from the list will be mapped to a useable tilt value. This is done because there are typically a finite number of selectable tilt values on a weather radar antenna controller.

In the previous example with $\theta_A$=2.89°, $\theta_B$=−6.62°, and θ=3°, successively adding the beamwidth θ to the lower tilt angle $\theta_B$ and then to the sum of each addition thereafter results in the following:

$\theta_B$+θ=−6.62°+3=−3.62, −3.62+3=−0.62, −0.62+3=2.38, 2.38+3= 5.38

Each of the sums above represents the list of tilt angles stored and then mapped to the nearest tilt setting for the weather radar antenna.

Range values are suggested with each tilt value based upon the tilt value and the current altitude. In this example, the range values will be 100 nautical miles for all tilt values that allow the bottom of the radar beam to sweep parallel or at a positive angle relative to the earth's surface. For tilts outside that area, basic trigonometry is used to determine how long the radar beam will travel before it contacts the earth surface. With this knowledge, a range can be associated with each tilt value. Suggested range values will minimize or eliminate ground clutter returns.

At this point the storm finder algorithm will suggest a tilt value to the antenna controller 125 (FIG. 1) that will cause the antenna to scan the area in front of the aircraft and then suggest successive tilt values above and below the first tilt value until the search is complete. The algorithm will then create a new tilt list based on the current altitude of the aircraft and the freezing level and the process will repeat itself.

Figure 5:
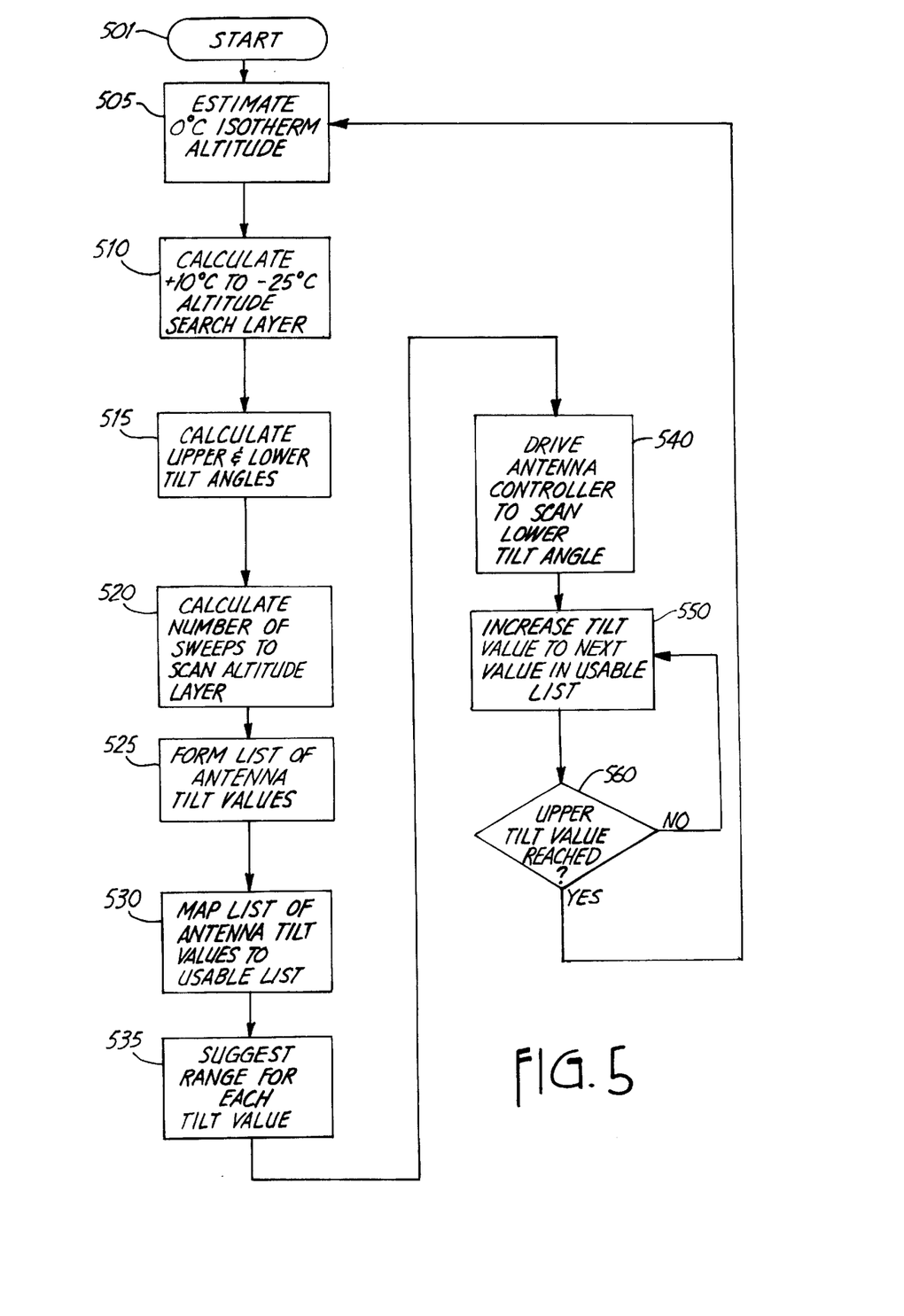
FIG. 5 is a flow diagram of the operation of the present invention.

FIG. 5 is a flow chart that shows in summary fashion the operation of the automatic storm finding algorithm in the automatic storm finding weather radar computer 130 of FIG. 1. The algorithm operation starts at step 501. An estimate of the approximate 0° C. isotherm altitude is made at step 505 from altimeter and thermometer or data link inputs as previously discussed. The algorithm then calculates (510) the +10° C. to −25° C. altitude search layer for storm activity by the automatic storm finding radar. At step 515 the upper and lower tilt angles are calculated using Equations 7–10 and the data from steps 505 and 510, the current aircraft altitude, the desired search range, and the antenna beamwidth. The number of scans to search the altitude layer is determined at step 520 from the tilt angles and the antenna beamwidth. At step 525 a list of tilt values is formed by adding the antenna beamwidth to the lower tilt value until the upper tilt value is reached. This list is then mapped to useable tilt values (530) for the antenna controller 125 of FIG. 1. A range value for the weather radar is suggested for each tilt value based on current aircraft altitude (535). A suggested lower tilt value is used to drive the antenna controller to scan (540) that tilt value. The tilt value is then increased to the next value in the list and the antenna controller scans this next tilt value (550). At step 560 a determination is made if the upper tilt value is reached. If not step 550 is repeated. If the upper tilt value is reached, the whole algorithm is repeated using any new data for the aircraft altitude and for the 0° C. isotherm.

Figure 6:
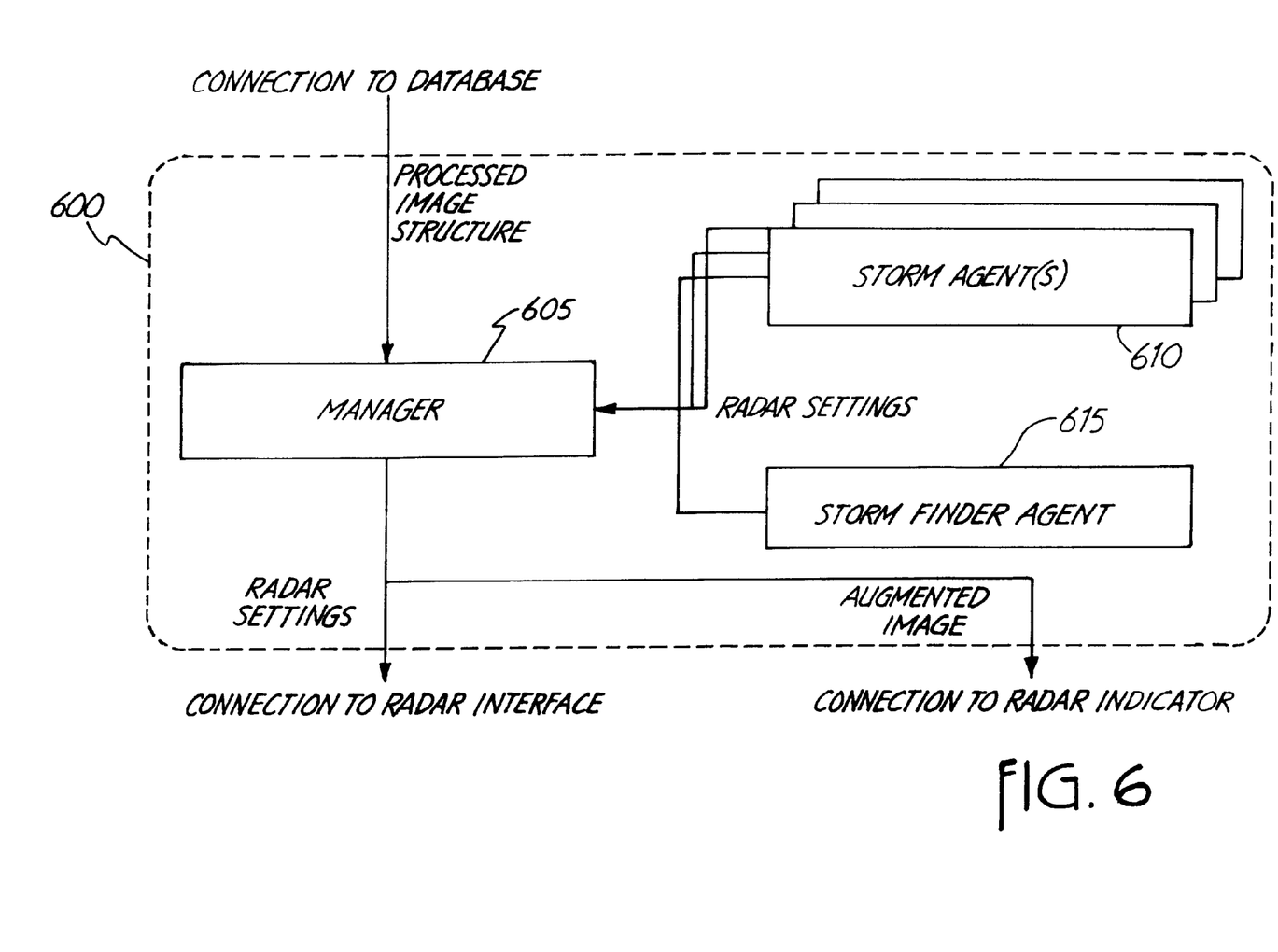
FIG. 6 is a diagram of an intelligent agent software architecture implementation of the present invention.

The software to perform the automatic storm finding algorithm in an automatic storm finding weather radar computer 130 of FIG. 1 can be included as part of an intelligent agent software architecture 600 shown in FIG. 6. Intelligent agents are known in the art. An intelligent agent is an autonomous software system that can decide what it needs to do. Intelligent agents are agents that can do reasoning or planning. An intelligent agent makes use of knowledge and inference to perform tasks on behalf of the user. An agent is given a set of goals and then acts to carry out these goals. Several agents are needed to perform the tasks in a weather radar system. This results in a multi-agent system with several semi-autonomous agents interacting to perform a set of tasks or goals under the control of a manager.

In FIG. 6 the storm finder agent 615 contains the automatic storm finding algorithm that recommends the tilt and range values for the automatic storm finding weather radar. In operation of the software, the manager 605 retrieves a weather image structure from the weather radar database. The weather image structure contains information on the number of storm cells in the image and where they are located in the image. The manager 605 creates a storm agent 610 for each new storm cell. The storm agents 610 evaluate the storm cells to determine if their assigned storm cells are hazardous and what additional information is needed regarding that storm. If a storm cell is hazardous, the storm agent 610 will inform the manager 605 on why the storm is hazardous. If the storm agent needs information about is associated storm cell, it recommends a tilt and range setting for the automatic storm finding weather radar so it can get the needed information on the next radar scan. The manager 605 will augment the image with information about the hazardous storm and notify the pilot on the display. The manager 605 prioritizes the storm agent's request based upon the proximity of the storm to the aircraft and the aircraft's flight plan. If no storm agents exist, the manager 605 invokes the storm finder agent 615 to search for storms in the atmosphere. The storm finder agent 615 can also be used in the background to search for other storms.

It is believed that the automatic storm finding weather radar of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An automatic storm finding weather radar comprising:
   an antenna having a beamwidth for transmitting radar signals and receiving radar signals reflected from a storm;
   a receiver/transmitter connected to the antenna for generating radar signals and receiving radar signals reflected from a storm from the antenna;
   a signal processor connected to the receiver/transmitter for processing the received radar signals reflected from the storm into weather data indicating the storm;
   a display connected to the signal processor for displaying the storm;
   an antenna controller for controlling tilt and scan of the antenna; and
   a computer for controlling the automatic storm finding weather radar wherein the computer further comprises an automatic storm finding algorithm for locating storms by determining temperatures and altitudes that produce the storms, determining an altitude search layer over the temperatures and altitudes that produce the storms and driving the antenna controller to adjust the antenna tilt and scan to locate the storms in the search layer at a desired range from the aircraft;
   wherein the computer automatic storm finding algorithm determines an approximate 0° C. isotherm altitude;
   wherein the computer automatic storm finding algorithm estimates altitudes of approximate −25° C. and approximate +10° C. temperatures based on the approximate 0° C. isotherm altitude to determine an altitude search layer;
   wherein the computer automatic storm finding algorithm determines antenna upper and lower tilt angles from aircraft altitude, the altitude search layer, and the desired range; and
   wherein the computer automatic storm finding algorithm determines from the upper and lower tilt angles and the antenna beamwidth a number sweeps the antenna must make to scan an area to locate the storms in the altitude search layer.

2. The automatic storm finding weather radar of claim 1 wherein the computer automatic storm finding algorithm determines the approximate 0° C. isotherm altitude from temperature and altitude data from a thermometer and an altimeter.

3. The automatic storm finding weather radar of claim 1 wherein the computer automatic storm finding algorithm determines the approximate 0° C. isotherm altitude from freezing altitude level data transmitted over a data link.

4. The automatic storm finding weather radar of claim 1 wherein the computer automatic storm finding algorithm forms a list of tilt values by successively adding the antenna beamwidth to the lower tilt angle until an additive value is greater or equal to the upper tilt angle and maps the list of tilt values to a useable tilt value for the antenna controller.

5. The automatic storm finding weather radar of claim 4 wherein the computer automatic storm finding algorithm suggests range values for each tilt angle based on the tilt angle and current aircraft altitude.

6. The automatic storm finding weather radar of claim 5 wherein the computer automatic storm finding algorithm causes the antenna controller to drive the antenna to scan an area in front of the aircraft at the lower tilt angle and then increases to a next tilt angle to successively scan until the upper tilt angle is reached.

7. The automatic storm finding weather radar of claim 6 wherein the computer automatic storm finding algorithm creates a new list of tilt angles based on the current altitude of the aircraft and a new 0° C. isotherm altitude and repeats the scan.

8. A method of storm finding in an automatic storm finding weather radar comprising:
   estimating an altitude where storms begin to generate radar echoes;

determining an altitude search layer from the altitude where storms begin to generate radar echoes;

calculating antenna upper and lower tilt angles from a current aircraft altitude, the altitude search layer, and a desired range;

forming a list of useable antenna tilt values to scan the altitude search layer from the antenna upper and lower tilt angles and antenna beamwidth; and driving an antenna controller to scan the altitude search layer and the desired range with the antenna tilt values from the list of antenna tilt values; and repeating the previous steps;

wherein the step of forming a list of antenna tilt values further comprises the steps of:

calculating a number of antenna sweeps to scan the search altitude layer from the antenna upper and lower tilt angles and antenna beamwidth;

forming a list of antenna tilt values by successively adding the antenna beamwidth the lower tilt angle until the additive value is greater of equal to the upper tilt angle; and mapping the list of antenna tilt angle to a useable list of tilt values for an antenna controller.

9. The method of storm finding in an automatic storm finding weather radar of claim 8 wherein the step of estimating the altitude where storms begin to generate radar echoes further comprised the steps of determining an altitude of an approximate 0° C. isotherm.

10. The method of claim 9 wherein the step of determining the altitude of the approximate 0° C. isotherm is performed with altitude and temperature data from an altimeter and a thermometer.

11. The method of claim 9 wherein the step of determining the altitude of the approximate 0° C. isotherm is performed with freezing level altitude data from a data link.

12. The method of claim 9 wherein the step of determining the search altitude layer further comprises calculating from the approximate 0° C. isotherm altitude an approximate +10° C. to −25° C. altitude search layer.

13. The method of claim 8 wherein the step of driving the antenna controller to scan the altitude search layer and the desired search range further comprises the steps of:

suggesting weather radar range values for each tilt angle based on the current aircraft altitude;

driving the antenna by the antenna controller to scan an area in front of the aircraft for a storm at the lower tilt angle; and increasing successively to a next tilt angle in the useable list of tilt values to scan an area in front of the aircraft for a storm until the upper tilt angle is reached.

14. A method of storm finding in an automatic storm finding weather radar comprising:

estimating an altitude of an approximate 0° C. isotherm;

calculating an approximate +10° C. to −25° C. altitude layer from the altitude of the approximate 0° C. isotherm;

calculating antenna upper and lower tilt angles from a current aircraft altitude, the approximate +10° C. to −25° C. altitude layer, and a desired range;

calculating a number of antenna sweeps to scan the approximate +10° C. to −25° C. altitude layer from the antenna upper and lower tilt angles and antenna beamwidth;

forming a list of antenna tilt values by successively adding the antenna beamwidth the lower tilt angle until the additive value is greater of equal to the upper tilt angle;

mapping the list of antenna tilt angle to a useable list of tilt values for an antenna controller;

suggesting weather radar range values for each tilt angle based on the current aircraft altitude;

driving the antenna by the antenna controller to scan an area in front of the aircraft for a storm at the lower tilt angle;

increasing successively to a next tilt angle in the useable list of tilt values to scan an area in front of the aircraft for a storm until the upper tilt angle is reached; and repeating the previous steps.

\* \* \* \* \*